┌─────────────────────────────────────────────┐
United States Patent Office 3,705,161
Patented Dec. 5, 1972

---

3,705,161
5-HYDROXY-4-(4-PHENYL-1-PIPERAZINYL-HYDROBENZ[c,d]INDOLES
Raj K. Razdan, Belmont, and Fatima N. Johnson, Arlington, Mass., assignors to Arthur D. Little, Inc., Cambridge, Mass.
No Drawing. Original application Apr. 23, 1968, Ser. No. 723,572, now Patent No. 3,575,989, dated Apr. 20, 1971. Divided and this application July 27, 1970, Ser. No. 64,876
Int. Cl. C07d 51/70
U.S. Cl. 260—268 TR                    3 Claims

---

ABSTRACT OF THE DISCLOSURE 5-hydroxy-4-saturated heterocyclic amino-1,2,2a,3,4,5-hexahydrobenz[c,d]indoles are prepared by amination of 1-benzoyl - 4,5 - epoxy - 1,2,2a,3,4,5-hexahydrobenz[c,d]indole with an appropriate secondary amino followed by debenzoylation and in turn are converted, if desired, to the corresponding tetrahydro compounds by dehydrogenation. The compounds are useful as central nervous system depressants.

---

This application is a divisional of our copending application Ser. No. 723,572, filed Apr. 23, 1968, now U.S. Pat. 3,575,989.

This invention relates to chemical compositions of matter classified as 1,2,2a,3,4,5 - hexahydrobenz[c,d]indoles and 1,3,4,5-tetrahydrobenz[c,d]indoles.

The invention sought to be patented resides in the concept of 5 - hydroxy-4-(N=B)-1,2,2a,3,4,5 - hexahydrobenz[c,d]indoles and 5 - hydroxy-4-(N=B)-1,3,4,5-tetrahydrobenz[c,d]indoles having the formulas

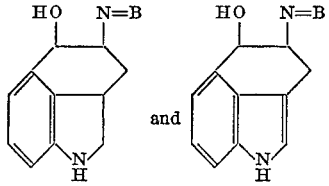

wherein in each instance N=B is a saturated heterocyclic amino radical

having 5 to 7 nuclear atoms, wherein Z is a saturated bivalent radical selected from the group consisting of alkylene oxadialkylene, thiadialkylene, azadialkylene and N-phenylazadialkylene. These compounds have pharmacodynamic activity, being useful for example as central nervous depressants.

As used herein

means a saturated heterocyclic amino radical having 5 to 7 nuclear atoms and thus includes pyrrolidyl, 2,5-dimethylpyrrolidyl, 2 - methylpyrrolidyl, 2 - isopropylpyrrolidyl and like alkylpyrrolidyl groups, piperidyl, 5-ethylpiperidyl, 2,6 - dimethylpiperidyl and like alkylpiperidyl groups, 4-morpholinyl, 2,6-diethyl-4-morpholinyl, 2-ethyl-4-morpholinyl and like alkylmorpholinyl groups, 4-thiamorpholinyl, 2,6 - dimethyl-4-thiamorpholinyl, 6-ethyl-4-thiamorpholinyl and like alkylthiamorpholinyl groups, piperazinyl, 4 - lower-alkyl - 1 - piperazinyl, 4 - phenyl-1-piperazinyl, hexamethyleniminyl and the like; and Z is therefore a saturated bivalent radical selected from alkylene, oxadialkylene, thiadialkylene, and N-phenylazadialkylene including for example tetramethylene, pentamethylene, hexamethylene, —CH$_2$OCH$_2$CH$_2$—,

—CH$_2$CH$_2$OCH$_2$CH$_2$—, —CH$_2$CH$_2$CH$_2$OCH$_2$CH$_2$—

—CH$_2$CH$_2$SCH$_2$CH$_2$—, CH$_2$CH$_2$CH$_2$SCH$_2$CH$_2$—

N(CH$_2$CH$_2$)$_2$C$_6$H$_5$, and the like.

The tetra- and hexahydrobenz[c,d]indoles of the invention are obtained by interacting 1-benzoyl-5-hydroxy-4-(N=B)-1,2,2a,3,4,5 - hexahydrobenz[c,d]indole with aqueous alcoholic sodium hydroxide at reflux temperature in an inert atmosphere, as for example nitrogen. The reaction mixture thus obtained is extracted with an organic solvent, as for example, chloroform, ether, benzene or toluene and the organic layer is separated, filtered, concentrated and, if desired, purified to yield 5-hydroxy-4-(N=B)-1,2,2a,3,4,5 - hexahydrobenz[c,d]indole. The latter can, if desired, be dehydrogenated over palladium in boiling xylene, to yield 5-hydroxy-4-(N=B)-1,3,4,5-tetrahydrobenz[c,d]indole.

The intermediate 1-benzoyl-5-hydroxy-4-(N=B)-1,2,2a, 3,4,5-hexahydrobenz[c,d]indoles are prepared by interacting the known 1-benzoyl-4,5-epoxy-1,2,2a,3,4,5-hexahydrobenz[c,d]indole with a secondary amine HN=B, wherein N=B has the same significance indicated hereinabove, at about 100–150° C. in an inert atmosphere as for example nitrogen. The amine is used in excess of equimolar amounts and conveniently is employed as a solvent medium in which case the reaction is preferably carried out at the reflux temperature. The reaction mixture thus obtained is distilled under reduced pressure to remove excess amine and the residue purified to yield the 1-benzoyl-5-hydroxy-4-(N=B) - 1,2,2a,3,4,5 - hexahydrobenz[c,d]indole.

Due to the presence of a basic tertiary amino grouping, the compounds of this invention react with organic and inorganic acids to form acid-addition salts. These acid-addition salts are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., Volumes III, IV, IX, X, XIV, XVII, XIX, XXI, XXII and XXV; organic mono and polysulfonic acid-sulfinic acids such as found, for example in Beilstein Volumes VI, XI, XVI, and XXII; organic phosphonic and phosphinic acids such as found, for example, in Beilstein Volumes XI and XVI; organic acids of arsenic and antimony such as found, for example, in Beilstein Volume XVI; organic heterocyclic carboxylic, sulfonic, and sulfinic acids such as found, for example, in Beilstein Volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's, Green and Co., New York, N.Y. Volumes I–XVI. In addition, other salt-forming compounds which are acidic in their chemical properties but which are not generally considered as acids in the same sense as carboxylic or sulfonic acids are also considered to be among the numerous acids which can be used to prepare the acid-addition salt forms of the compounds of this invention. Thus there are also included acidic phenolic compounds such as found, for example, in Volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley & Sons, Inc., New York, N.Y. (1959).

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, 3,5-dinitrobenzoic acid, anthranilic acid, cholic acid, 2-pyridine-carboxylic acid, pamoic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like. The acid-addition salts with lactic acid and with ethanesulfonic acid, for example, are water-soluble.

The acid-addition salts are prepared in conventional fashion, for instance either by direct mixing of the acid and the free base form or, when this is not appropriate, by dissolving either or both of the acid and the free base form separately in water or an organic solvent and mixing the two solutions, or by dissolving both the acid and the free base form together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the free base form of our compounds.

The acid-addition salt forms of the new compounds are useful not only as central depressants as herein indicated, but are also useful for characterizing and identifying purposes, and in isolation or purification procedures. Moreover, the acid-addition salts are sources of the free base forms, for instance by reaction with strong bases, and accordingly all of the acid-addition salts, regardless of considerations of solubility, toxicity, physical form, or the like of a particular salt, are useful for the purposes of our invention.

It will be appreciated from the above that if one or more of the characteristics, such as solubility, molecular weight, physical appearance, toxicity, or the like of a given free base or acid-addition salt form of a particular compound render that form less suitable for the purpose at hand, it can be readily converted to another, more suitable form.

The structure of the compounds of this invention followed from the methods of synthesis which were used and from the elementary analyses of the products obtained.

The invention is illustrated by the following examples without, however, being limited thereto.

EXAMPLE 1

(a) 1-benzoyl-5-hydroxy-4-piperidyl-1,2,2a,3,4,5-hexahydrobenz[c,d]indole

A solution of 2 g. of 1-benzoyl-4,5-epoxy-1,2,2a,3,4,5-hexahydrobenz[c,d]indole in 40 ml. of piperidine was stirred and refluxed for eighteen hours under nitrogen. The excess amine was removed by distillation under reduced pressure and the residue recrystallized from a benzene/petroleum ether mixture. After two recrystallizations from benzene there was obztained 2 g. of 1-benzoyl-5-hydroxy-4-piperidyl - 1,2,2a,3,4,5 - hexahydrobenz[c,d] indole, M.P. 190–192° C.

(b) 5-hydroxy-4-piperidyl-1,2,2a,3,4,5-hexahydrobenz[c,d]indole

A mixture of 1.9 g. of 1-benzoyl-5-hydroxy-4-piperidyl-1,2,2a,3,4,5-hexahydrobenz[c,d]indole and 2.2 g. of sodium hydroxide in 45 ml. of 66% aqueous ethanol was refluxed under nitrogen for twenty-one hours. The cooled solution was extracted with benzene, the benzene extracts washed with water and dried. Evaporation of the solvent under reduced pressure gave a solid which was collected by filtration then recrystallized from carbon tetrachloride to give 0.95 g. of 5-hydroxy-4-piperidyl-1,2,2a,3,4,5-hexahydrobenz[c,d]indole, M.P. 145–147° C. dec.

(c) 5-hydroxy-4-piperidyl-1,3,4,5-tetra hydrobenz[c,d]indole

A solution of 400 mg. of 5-hydroxy-4-piperidyl-1,2,2a, 3,4,5-hexahydrobenz[c,d]indole in 18 ml. of dry xylene containing 400 mg. of 10% palladium-on-charcoal was refluxed for thirty minutes then filtered through a sintered glass funnel to remove the catalyst. The filtrate was concentrated to about 1 ml. then taken up in 25 ml. of ether and saturated with dry hydrogen chloride. After removal of the ether under a stream of nitrogen the resultant solid was dissolved in a minimum amount of methanol and the solution diluted with ether. The solid which separated was collected by filtration to give 165 mg. of 5-hydroxy-4-piperidyl - 1,3,4,5 - tetrahydrobenz [c,d]indole hydrochloride, M.P. 230° C. dec. The free base was liberated by dissolving the hydrochloride in a minimum amount of water and adding an excess of 5% sodium hydroxide. The solid which precipitated was collected, dried and recrystallized from a 2:1 hexane/benzene mixture to give 100 mg. of 5-hydroxy-4-piperidyl-1,3,4,5-tetrahydrobenz[c,d]indole, M.P. 144–145° C.

EXAMPLE 2

(a) 1 - benzoyl-5-hydroxy-4-(4-phenyl-1-piperazinyl)-1,2,2a,3,4,5-hexahydrobenz[c,d]indole was prepared from 2 g. of 1-benzoyl-4,5-epoxy-1,2,2a,3,4,5-hexahydrobenz [c,d]indole and 10 ml. of phenylpiperazine using the procedure described in Example 1a. After recrystallization from methanol there was obtained 2 g. of 1-benzoyl-5-hydroxy-4-(4-phenyl-1-piperazinyl)-1,2,2a,3,4,5 - hexahydrobenz[c,d]indole, M.P. 204–206° C.

(b) 5-Hydroxy-4-(4-phenyl-1-piperazinyl)-1,2,2a,3,4,5-hexahydrobenz[c,d]indole was prepared from 2 g. of 1-benzoyl - 5-hydroxy-4-(4-phenyl-1-piperazinyl)-1,2,2a,3,4, 5-hexahydrobenz[c,d]indole, 1.8 g. of sodium hydroxide, 30 ml. of ethanol and 15 ml. of water using the procedure described in Example 1b. There was thus obtained 1.3 g. of 5 - hydroxy - 4-(4-phenyl-1-piperazinyl)-1,2,2a,3,4,5-hexahydrobenz[c,d]indole, M.P. 162–163° C.

(c) 5-hydroxy-4-(4-phenyl-1-piperazinyl)-1,3,4,5-tetrahydrobenz[c,d]indole.—A solution of 100 mg. of 5-hydroxy - 4-(4-phenyl-1-piperazinyl)-1,2,2a,3,4,5-hexahydrobenz[c,d]indole in 15 ml. of chloroform was saturated with hydrogen chloride and the solid hydrochloride which precipitated washed by decantation with ether. The dry solid was dissolved in 10 ml. of water and added to a suspension of one-half a teaspoon of activated Raney nickel in 20 ml. of water and the mixture refluxed for four hours. The aqueous portion was decanted from the white solid which separated and extracted with chloroform. The chloroform extracts were dried and the solvent removed by distillation under reduced pressure. The residual oil crystallized upon trituration with methanol and was collected by filtration. Recrystallization from methanol gave 15 mg. of 5 - hydroxy-4-(4-phenyl-1-piperazinyl)-1,3,4,5-tetrahydrobenz[c,d]indole, M.P. 200° C.

The following are further illustrative examples of the 5-hydroxy - 4 - (N=B) - 1,2,2a,3,4,5-hexahydrobenz[c,d] indole and 5 - hydroxy-4-(N=B)-1,3,4,5-tetrahydrobenz [c,d]indole which are obtained by proceeding in accordance with the methods hereinabove described:

5-hydroxy-4-pyrrolidyl-1,2,2a,3,4,5-hexahydrobenz[c,d] indole;

5-hydroxy-4-pyrrolidinyl-1,3,4,5-tetrahydrobenz[c,d] indole;

5-hydroxy-4-(2,6-dimethyl-1-piperidyl)-1,2,2a,3,4,5-hexahydrobenz[c,d]indole;

5-hydroxy-4-(2,6-dimethyl-1-piperidyl)-1,3,4,5-tetrahydrobenz[c,d]indole;

5-hydroxy-4-hexamethyleniminyl-1,2,2a,3,4,5-hexahydrobenz[c,d]indole;

5-hydroxy-4-(4-morpholinyl)-1,3,4,5-tetrahydrobenz[c,d]indole;

5-hydroxy-4-(1-piperazinyl)-1,2,2a,3,4,5-hexahydrobenz[c,d]indole;

5-hydroxy-2-(4-thiamorpholinyl)-1,3,4,5-tetrahydrobenz[c,d]indole;

5-hydroxy-4-hexamethyleniminyl-1,3,4,5-tetrahydrobenz[c,d]indole;

5-hydroxy-4-(1-homopiperazinyl)1,2,2a,3,4,5-hexahydrobenz[c,d]indole; and 5-hydroxy-4-(6-methyl-1-piperidinyl)-1,3,4,5-tetrahydrobenz[c,d]indole.

The 5 - hydroxy-4-(N=B)-1,2,2a,3,4,5-hexahydrobenz[c,d]indoles and 5 - hydroxy-4-(N=)-1,3,4,5-tetrahydro[c,d]indoles at intravenous dosages or 15 to 30 mg./kg. induce in mice a general activity decrease as compared to control animals when tested according to the procedure described by Irwin, Animal and Clinical Pharmacologic Techniques in Drug Evaluation (edited by Nodine and Siegler), Year Book Medical Publishers, Inc., Chicago, Ill. 1964, p. 46.

The compounds of the invention are prepared for use by conventional pharmaceutical formulation procedures; that is, in capsule or tablet form with conventional excipients (for example, calcium carbonate, starch, lactose, talc, magnesium stearate, gum acacia, and the like) for oral administration; or as an aqueous or oil solution or suspension in a pharmaceutically acceptable vehicle (water, aqueous alcohol, oil solution or oil-water emulsion) for oral or parenteral administration.

We claim:

1. A compound of the group consisting of 5-hydroxy-4-(N=B) - 1,2,2a,3,4,5 - hexahydrobenz[c,d]indole and 5-hydroxy - 4 - (N=B)-1,3,4,5-tetrahydrobenz[c,d]indole wherein N=B is 1-piperazine (4-phenyl).

2. 5 - hydroxy-4-(4-phenyl-1-piperazinyl)-1,2,2a,3,4,5-hexahydrobenz[c,d]indole according to claim 1 wherein Z is N-phenylazadiethylene.

3. 5 - hydroxy-4-(4-phenyl-1-piperazinyl)-1,3,4,5-tetrahydrobenz[c,d]indole according to claim 1 wherein Z is N-phenylazadiethylene.

References Cited

Stoll et al., Chem. Abstr. vol. 46, col. 123g (1952).

DONALD G. DAUS, Primary Examiner